United States Patent Office 3,705,989
Patented Dec. 12, 1972

3,705,989
FISH DISEASE TREATMENT WITH
NAPHTHYRIDINE DERIVATIVES
Yasuo Oshima, Tokyo, Nobuhiko Nakazawa, Urawa-shi, Senkichi Nagasaki, Tokyo, Takeo Naito, Ichikawa-shi, Yasuaki Osada, Tokyo, Naoya Okusa, Chiba-shi, Akira Inuaki, Sakura-shi, and Kazuyuki Tanaka, Chiba-shi, Japan, assignors to Daiichi Seiyaku Company Limited, Tokyo, Japan
No Drawing. Filed Sept. 25, 1969, Ser. No. 861,147
Claims priority, application Japan, Oct. 2, 1968, 43/71,103
Int. Cl. A61k 27/00
U.S. Cl. 424—256
9 Claims

ABSTRACT OF THE DISCLOSURE

Compositions useful in the treatment of fish diseases resulting from pathogenic organisms comprising a pharmaceutical carrier and a 1-substituted, 4-dihydro-7-[2-(5-nitro-2-furyl)-vinyl)]-4-oxo-1,8-naphthyridine, the 3-carboxy or methoxycarbonyl derivatives thereof or the alkali metal salts of the 3-carboxy-substituted derivative and a method of treating said fish diseases.

BACKGROUND OF THE INVENTION (1) Field of the invention

This invention relates to a chemotherapeutic agent useful in preventing and treating fish diseases and in disinfecting agents for pond water.

(2) Background of the invention

Recently, bacterial infections in fish have caused enormous injuries to fish farming operations. Such infections, in fact, have become the greatest menace to the development of fish farming.

It has further been noticed that halophilic vibrio species isolated from marine fish causes alimentary intoxication. The importance of the control of such infections in terms of food hygenics has therefore been recognized.

For the purpose of preventing and treating such diseases in fish, various drugs have been used, for example, antibiotics such as tetracycline, chlorotetracycline, chloramphenicol, as well as erythromycine or acriflavine, acrinol, iodine compounds, furan derivatives and sulfonamides.

However, such drugs have not been satisfactory for the purpose because of the resulting development of resistant strains of pathogenic bacteria and of their toxicities resulting from their long duration in fish as well as in pond water. Further, since a fairly large amount of such drugs in pond water is necessary to obtain effectiveness, they have not been satisfactory from the point of view of economical use and handling convenience.

As a result of the investigations to find a solution to the above problem, it was discovered by applicants that 1-substituted-1,4-dihydro-7-[2-(5-nitro-2-furyl) - vinyl]-4-oxo-1,8-naphthyridine-3-carbonyl derivatives were extremely effective against pathogenic microorganisms isolated from fish in both in vitro and in vivo tests.

Further, it was found that the said compounds disappeared after a short time from both fish bodies and pond water, resulted in very slight formation of resistant strains when employed, and furthermore, possessed low toxicity to both fish and mice.

SUMMARY OF THE INVENTION

An object of the present invention is to provide chemotherapeutic agents useful in preventing and treating fish diseases which is composed of 1-substituted-1,4-dihydro-7[2-(5-nitro-2-furyl)-vinyl]-4-oxo - 1,8 - naphthyridine-3-carbonyl derivatives.

Another object of the present invention is to provide useful disinfection compositions for contaminated pond water comprising the above compounds.

DETAILED DESCRIPTION OF THE INVENTION

The compounds of the present invention are represented by the following general formula:

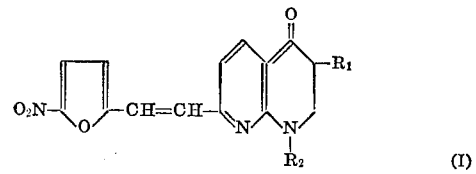

(I)

in which $R_1$ is selected from the group consisting of hydrogen, carboxy and methoxy carbonyl and $R_2$ is selected from the group consisting of hydrogen, methyl, allyl, the hydrochloric acid salt of 2-piperidinoethyl, diethyl aminoethyl and the cyclohexylsulfamic acid salt of diethyl amino ethyl. When $R_1$ is a carboxy group, alkali metal salts thereof are also contemplated.

Compounds in accordance with Formula I wherein $R_1$ is a free carboxylic acid are generally soluble in hot dimethyl formamide, ethylene glycol, and dimethyl sulfoxide and very slightly soluble in water.

Metal salts of such compounds (hereinafter referred to as "M.N."), such as the potassium salt, are soluble in water and insoluble in organic solvents. However, the solubility of such compounds or their salts in water may not be sufficient for practical use, because they may aggregate and float or precipitate when it is attempted to dissolve them directly into a large amount of water at the desired concentration of 10–20 mcg./ml., which is effective in combatting fish diseases.

It is therefore preferable to employ a previously prepared concentrate solution (about 100–500 mcg./ml.) for the dissolution of such compounds into pond water. However, their solubilities are not sufficient to allow the direct preparation of such solutions in such high concentration.

By studies of the solubilization of M.N., it was found that solubilities could be so increased as to be sufficiently soluble at such high concentrations (100–500 mcg./ml.) if the M.N. was employed in the form of a composition containing an alkaline metal salt of ethylenediaminetetraacetic acid (EDTA·nM) and a pharmaceutical carrier.

Said compositions can also be applied to direct use for dissolution into pond water without aggregation, floating or precipitation. The effective ratio of EDTA·nM to M.N. in said compositions varies, depending upon the composition of the particular pond water and upon the concentration of EDTA·nM and M.N. employed. In general the ratio of EDTA·nM to M.N. employed falls between 1:1 and 10:1 by weight. For example, a composition containing EDTA·4Na and potassium 1-methyl-1,4-dihydro-7-[2-(5-nitro-2-furyl)vinyl]-4-oxo - 1,8 - naphthyridine-3-carboxylate (hereinafter referred to as compound 677K) in a proportion of 3–6:1 (by weight) could be easily dissolved in pond water, even at a concentration of 100 mcg. (677K)/ml. By utilizing this new composition, there was further found to be an improvement in the stability of dissolved M.N., in addition to an improvement in solubility. The stability results are shown in the following Table 1.

TABLE 1 [1]

| Temp. for testing accelerated ageing | 20° C. | | 30° C. | | 40° C. | | 60° C. | |
|---|---|---|---|---|---|---|---|---|
| Time maintained, hours | 24 | 48 | 5 | 21 | 5 | 21 | 5 | 21 |
| Residual ratios of 667K (A) [2], percent | 98 | 96 | 97 | 95 | 96 | 93 | 91 | 72 |
| Residual ratios of 667K (B) [2], percent | 100 | 100 | 100 | 100 | 100 | 99 | 98 | 95 |

[1] Tested in the absence of light.
[2] (A) Initial concentration—10 mcg. (677K)/ml.; (B) Initial concentration—10 mcg. (677K) +100 mcg. EDTA·4NA/ml.

As practically utilizable EDTA salts, there may be exemplified EDTA·2Na, EDTA-Ca2Na, EDTA·3Na or EDTA·4Na.

The new compositions of this invention may be used conveniently in the form of powders, granules or microgranules which are prepared in the usual manner, familiar to those skilled in the art, by using suitable excipient such as lactose, starch, sodium bicarbonate, dibasic calcium hydrogen phosphate and the like, such binders as CMC, PVP, PVA, acacia, water and the like, and such distintegrators as AVICEL, ECG and the like.

The compounds in accordance with Formula I, M.N. and said compositions thereof each show excellent activity in inhibiting the growth of pathogenic microorganisms isolated from fish.

For example, the inhibitory activities of potassium 1-methyl-1,4-dihydro-7-[1-5-nitro-2-furyl)vinyl]-4-oxo - 1,8-naphthyridine-3-carboxylate (677K), and other compounds of this invention against a spectrum of bacteria, is presented in the following Table 2, in which the minimal inhibitory concentration (M.I.C.) is compared against those of dihydroxyfuratrizine (D.F.) and tetracycline (T.C.).

The inhibitory activities against fungi were measured in the following manner.

The fungi were preincubated in a glucose-peptone medium for sterilizing test for one week at a temperature of 27° C. (slant in test tube). To the culture was added 10 ml. of isotonic sodium chloride solution to obtain a suspension of the fungi, then, one loop full of the flating liquor was inoculated on the glucose-peptone medium for sterilizing test which contained each drug. After continuing the incubation for one week at a temperature of 27° C., the MIC was determined by the visible appearance of growth. For the purpose of preventive and therapeutic use of the compounds in accordance with Formula I, dissolving the compound (2.0~30 mcg./ml.) into the fish pond water, bathing the diseased fish in water containing the compound (2.5~20 mcg./ml.), and administrating the compound (2.5~10 mg./kg.) to the diseased fish by gavage, are all effective.

For the purpose of disinfecting contaminated pond water, a compound of this invention, preferably in the form of the aforesaid novel composition, is dissolved into the pond water.

TABLE 2.—THE MINIMAL INHIBITORY CONCENTRATION (MCG./ML.) AT 30° C. FOR 48 HOURS

| Microorganisms | 677K | 714 | 829 | 856 | 888 | 900 | 920 | DF | TC |
|---|---|---|---|---|---|---|---|---|---|
| Aeromonas liquefacines:T-ET | 0.05 | 0.2 | 0.1 | 0.4 | 0.2 | 0.4 | 0.1 | 0.05 | 1.6 |
| Aeromonas liquefacines:Y062 | 0.05 | 0.2 | 0.2 | 0.4 | 0.2 | 0.4 | 0.05 | 0.025 | 1.6 |
| Aeromonas liquefacines:6753 | 0.025 | 0.1 | ≤0.0125 | 0.4 | 0.8 | 0.8 | 0.05 | ≤0.0125 | 0.8 |
| Aeromonas liquefacines:R1 | 0.025 | 0.2 | 0.2 | 0.4 | 0.4 | 0.4 | 0.2 | ≤0.0125 | 0.8 |
| Aeromonas liquefacines:A1 | ≤0.0125 | 0.0125 | 0.025 | ≤0.0125 | 0.05 | 0.025 | ≤0.0125 | ≤0.0125 | 0.8 |
| Aeromonas salmonicida:Aa-1 | ≤0.0125 | 0.05 | 0.0125 | 0.05 | 0.1 | 0.1 | 0.025 | ≤0.0125 | 0.8 |
| Aeromonas salmonicida:A.T.C.C. 14174 | 0.025 | | | | | | | 0.025 | 1.6 |
| Aeromonas salmonicida:Daiichi | | 0.05 | 0.1 | 0.1 | 0.1 | 0.1 | 0.025 | | |
| Aeromonas salmonicida | 0.025 | | | | | | | 0.1 | 1.6 |
| Aeromonas hydrophila:1AM 1018 | ≤0.0125 | 0.025 | 0.025 | 0.025 | 0.05 | 0.025 | 0.025 | 0.025 | 0.4 |
| Aeromonas punciata:1Am1646 | 0.025 | 0.05 | 0.025 | 0.1 | 0.2 | 0.2 | 0.1 | 0.05 | 0.8 |
| Vibrio anguillarium:PB-3 | ≤0.0125 | 0.0125 | ≤0.0125 | ≤0.0125 | 0.025 | 0.025 | ≤0.0125 | 0.0125 | 0.8 |
| Vibrio anguillarium:PB-5 | 0.05 | 0.025 | ≤0.0125 | ≤0.0125 | 0.025 | 0.025 | ≤0.0125 | 0.025 | 1.6 |
| Vibrio anguillarium:PB-7 | 0.025 | ≤0.0125 | ≤0.0125 | ≤0.0125 | 0.025 | 0.025 | ≤0.0125 | 0.0125 | 1.6 |
| Vibrio anguillarium:PB-15 | ≤0.0125 | | | | | | | ≤0.0125 | 0.8 |
| Vibrio anguillarium:K-3 | ≤0.0125 | | | | | | | 0.025 | 0.8 |
| Vibrio anguillarium:KT-1 | ≤0.0125 | | | | | | | 0.025 | 0.8 |
| Vibrio anguillarium:KT-9 | ≤0.0125 | 0.0125 | 0.1 | 0.05 | 0.1 | 0.025 | 0.1 | 0.05 | 1.6 |
| Vibrio anguillarium:H-126 | 0.025 | | | | | | | 0.05 | 0.8 |
| Vibrio anguillarium:H-128 | ≤0.0125 | 0.05 | 0.025 | 0.05 | 0.05 | 0.05 | 0.1 | 0.05 | 1.6 |
| Vibrio anguillarium:KC-8 | ≤0.0125 | | | | | | | 0.025 | 0.8 |
| Vibrio anguillarium:K-104 | ≤0.0125 | | | | | | | 0.025 | 0.8 |
| Vibrio anguillarium:KS-8 | ≤0.0125 | | | | | | | ≤0.0125 | 0.4 |
| Vibrio anguillarium:KNSK | ≤0.0125 | | | | | | | 0.025 | 0.4 |
| Vibrio anguillarium:Tr-7s1 | ≤0.0125 | | | | | | | 0.025 | 0.4 |
| Vibrio pisium:V-5 | ≤0.0125 | | | | | | | 0.025 | 0.8 |
| Trichophyton mentagrophytes | 1.0 | | | | | | | 10.0 | |
| Trichophyton interdigitale | 10.0 | | | | | | | 10.0 | |
| Microsporum gyseum | 1.0 | | | | | | | 10.0 | |
| Aspergillus fumigatus | 10.0 | | | | | | | 10.0 | |
| Candida albicans | 1.0 | | | | | | | 100.0 | |
| Cryptoccus neoformas | 0.1 | | | | | | | 10.0 | |

[1] 677K=Potassium 1-methyl 1,4-dihydro-7-(2-(5-nitro-2-furyl)vinyl)-4-oxo-1,8-naphthyridine-3-carboxylate; 714=1-allyl-1,4-dihydro-7-(2-(5-nitro-2-furyl)vinyl)-4-oxo-1,8-naphthyridine-3-carboxylic acid; 829=Methyl 1,4-dihydro-7-(2-(5-nitro-2-furyl)vinyl)-4-oxo-1,8-naphthyridine-3-carboxylate; 856=1-(2-piperidinoethyl)-1,4-dihydro-7-(2-(5-nitro-2-furyl)vinyl)-4-oxo-1,8-naphthyridine-3-carboxylic acid hydrochloride; 888=1-(2-diethylaminoethyl)-1,4-dihydro-7-(2-(5-nitro-2-furyl)vinyl)-4-oxo-1,8-naphthyridine-3-carboxylic acid cyclohexyl sulfamic acid; 900=Potassium 1-(2-diethylaminoethyl)-1,4-dihydro-7-(2-(5-nitro-2-furyl)vinyl)-4-oxo-1,8-naphthyridine-3-carboxylate; 920=1,4-dihydro-7-(2-(5-nitro-2-furyl)vinyl-4-oxo-1,8-naphthyridine.

The inhibitory activities against such bacteria as isolated from fish were measured as M.I.C. by the following method.

The bacteria was preincubated in peptone medium for 24 hrs. at a temperature of 30° C. and after preincubation the culture broth was diluted with isotonic sodium chloride solution to 1,000 times volume. One loop full of the diluted solution was then inoculated onto heart infusion agar medium containing each drug. After continuing the incubation for 48 hrs. at a temperature of 30° C., the MIC was determined by the visible appearance of the growth.

The compounds in accordance with Formula I are ideal for the above purposes, since sufficient effects are obtained at low concentrations as a result of their excellent activity and in view of their freedom from secondary effects to humans.

Compounds in accordance with Formula I are particularly effective in eel red disease, salmonoid furunculosis, bacterial gill-disease (in salmon trout, eel and mud-fish) and vibrio infections (in yellow tail, ayu, salmon, trout, swell fish and red snapper). Further, they indirectly prevent enteritis infections in humans caused by vibrio originating from consumed fish.

The following examples will illustrate the present invention in detail.

EXAMPLE 1

Groups consisting of 10 healthy eels (*Anguilla japonica*) weighing 7 to 14 g. were used. The fish were inoculated intramuscularly with $8.5 \times 10^7$ of *Aeromonas liquefacines*, Y-62 strain per 10 g. of body weight, and immediately after inoculation treated by bathing them in water containing potassium 1-methyl-1,4-dihydro-7-[2-(5-nitro-2-furyl(vinyl]-4-oxo-1, 8-naphthyridine-3-carboxylate (677K) at concentrations varying from 2.5 to 20.0 mcg./ml. at a temperature of 20° C. for 30 min.

After bathing, the fish were transferred into fresh water (20° C.) containing no drug.

The bathing was twice repeated, 24 and 48 hrs. after inoculation.

Dihydroxy furatrizine (D.F.) and tetracycline (T.C.) were tested in the same manner and their chemotherapeutic effects were determined by a comparison of survival numbers and survival days for each group.

The results are listed in the following table.

| Drugs | Bathing group Concentration, mcg./ml. | 7 days after infection Survival days | No. of survival eel | $ED_{50}$, mcg./ml. |
|---|---|---|---|---|
| Control | 0 | 2.0 | 0 | |
| 677K | 2.5 | 4.2 | 2 | |
| | 5.0 | 5.8 | 7 | 3.82 |
| | 10.0 | 6.9 | 9 | (2.66–5.58) |
| | 20.0 | 7.0 | 10 | |
| DF | 5.0 | 2.5 | 1 | |
| | 10.0 | 3.2 | 0 | 20.0 |
| | 20.0 | 4.2 | 2 | |
| TC | 5.0 | 3.1 | 1 | |
| | 10.0 | 2.9 | 1 | 20.0 |
| | 20.0 | 3.1 | 0 | |

| Drugs | P.O. group Dose, mg./kg. | 7 days after infection Survival days | No. of survival eel | $ED_{50}$, mg./kg. |
|---|---|---|---|---|
| Control | 0 | 3.0 | 0 | |
| 677K | 2.5 | 5.0 | 2 | |
| | 5.0 | 7.0 | 10 | 5.0 |
| | 10.0 | 7.0 | 10 | |
| TC | 25.0 | 5.9 | 2 | |
| | 50.0 | 7.0 | 10 | 50.0 |
| | 100.0 | 6.5 | 9 | |

As shown in the above table, the drug (677K) is more effective by oral administration than T.C.

EXAMPLE 3

Aeromonas liquefacines: Y-62, *Aeromonas salmonicida* and *Vibrio anguillarium*: k-3 were used in this experiment. Each microorganism ($10^6 \sim 10^8$/ml. was suspended in distilled water or in artificial marine water kept at a temperature range of from 20° C. to 25° C. and the drug (677K) was immediately added at a concentration of 1.0 to 5.0 mcg./ml. The number of each bacteria surviving at each time after disinfection was calculated from the grown colony count according to the following incubations.

Each collected water sample at each time was incubated with nutriant agar plate (Aeromonas) or with nutrient agar plate containing 3% sodium chloride (Vibrio) for 48 hrs. at a temperature of 22° C.

The disinfective effects, shown by the logarithmic scale of visible colony count are listed in the table below.

| Microorganisms | Water (temp.) | Minutes after treatment with 677K | Concentration of 677K (mcg./ml.) 0[1] | 1.0 | 2.5 | 5.0 |
|---|---|---|---|---|---|---|
| *A. liquefaciens*:Y-62 | Distilled water (20° C.) | 0 | [2]6.9 | [2]6.9 | [2]6.9 | [2]6.9 |
| | | 2 | 6.9 | 5.6 | 4.2 | 3.3 |
| | | 5 | 6.6 | 4.6 | 2.4 | 0 |
| | | 10 | 6.6 | 2.4 | 0.3 | 0 |
| | | 15 | 6.6 | 0 | 0 | 0 |
| | | 20 | 6.6 | 0 | 0 | 0 |
| | | 30 | 6.4 | 0 | 0 | 0 |
| *A. salmonicida* | Distilled water (25° C.) | 0 | 7.3 | 7.3 | 7.3 | 7.3 |
| | | 5 | 6.9 | 3.0 | 0 | 0 |
| | | 10 | 6.8 | 2.5 | 0 | 0 |
| | | 15 | 6.0 | 0 | 0 | 0 |
| | | 20 | 6.2 | 0 | 0 | 0 |
| | | 30 | 6.7 | 0 | 0 | 0 |
| *V. anguillarium*:K-3 | Marine water (15° C.) | 0 | 7.8 | 7.8 | 7.8 | 7.8 |
| | | 5 | 7.8 | 4.0 | 4.0 | 0 |
| | | 10 | 7.8 | 2.7 | 0 | 0 |
| | | 15 | 7.6 | 0 | 0 | 0 |
| | | 20 | 7.4 | 0 | 0 | 0 |
| | | 30 | 6.7 | 0 | 0 | 0 |

[1] Control.
[2] Number (log) of colonies/ml.

The results listed in the above table show that the effect of treatment with the drug (677K) is far superior to the results obtained with the other tested compounds.

EXAMPLE 2

In the same manner as described in Example 1, aqueous suspensions of 677K were administered orally to infected eels, at dosages ranging from 2.5~10 mg./kg. (body weight) by a stomach tube. The administration was repeated two more times after 24 and 48 hrs. T.C. was tested in the same way. The chemotherapeutic effects were determined by a comparison of the survival numbers and survival days during 7 days' farming in fresh water at a temperature range of 18° C. to 21° C.

The results are listed in the following table.

EXAMPLE 4

Microgranule composition: EDTA·4Na: 677K=5:1

The following components were well mixed and formed into 50 mesh microgranules in the conventional manner:

| | G. |
|---|---|
| 677K | 10 |
| EDTA·4Na | 50 |
| Lactose | 943 |
| Polyvinylalcohol | 6 |
| Total | 1000 |

The resulting composition could be clearly dissolved in pond water at a concentration of 100 mcg. (677K)/ml. without any aggregation occurring.

EXAMPLE 5

Microgranule composition: EDTA·2Na: 677K=8:1

Microgranules were obtained from the following components in the same manner as in Example 4, and the resulting composition was also easily dissolved in pond water as in Example 4:

| | G. |
|---|---|
| 677K | 100 |
| EDTA·2Na | 800 |
| Lactose | 70 |
| Polyvinylpyrrolidone | 30 |
| Total | 1000 |

EXAMPLE 6

Powder: EDTA·Ca·2Na: 677K=10:1

A 100 mesh-powder was prepared from the following components in the conventional manner and the same result as in Example 5 was obtained:

| | G. |
|---|---|
| 677K | 10 |
| EDTA·Ca·2Na | 100 |
| Corn starch | 890 |
| Total | 1000 |

EXAMPLE 7

In the same manner as in Example 4, a microgranule composition of the compound 900 was prepared, and the composition could be clearly dissolved in pond water without any aggregation.

What is claimed is:

1. A composition effective in the treatment and prevention of fish diseases caused by pathogenic microorganisms which comprises a pharmaceutical carrier, a compound of the formula

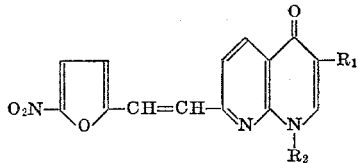
(I)

wherein $R_1$ is selected from the group consisting of hydrogen, carboxy, methoxycarbonyl and alkali metal oxycarbonyl, and $R_2$ is selected from the group consisting of hydrogen, methyl, allyl, 2-piperidinoethyl, the hydrochloric acid salt of 2-piperidinoethyl, 2-diethylaminoethyl, and the cyclohexyl sulfamic acid salt of 2-diethylaminoethyl and as a solubilizer a metal salt of ethylenediaminetetraacetic acid represented by the formula

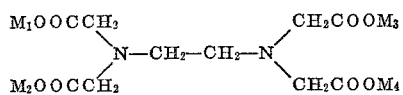

wherein $M_1$, $M_2$, $M_3$ and $M_4$ each are selected from the group consisting of hydrogen, sodium and calcium, said compound being present in a pharmaceutically effective amount.

2. The composition of claim 1 wherein said metal salt of ethylene diaminetetraacetic acid is EDTA·4Na.

3. The composition of claim 1 wherein the metal salt of ethylene diaminetetraacetic acid is EDTA·2Na.

4. The composition of claim 1 in which the metal salt of ethylene diaminetetraacetic acid is EDTA·Ca2Na.

5. The composition of claim 1 wherein said compound is potassium 1 - methyl - 1,4 - dihydro - 7 - [2-(5-nitro-2-furyl)vinyl]-4-oxo-1,8-naphthyridine-3-carboxylate.

6. A method for disinfecting pond water from fish disease caused by a pathogenic organism comprising adding the composition of claim 1 to pond water so as to provide a concentration in said pond water of from 1 to 5 mcg. of active compound per ml. of pond water.

7. A method for treatment of fish diseases caused by a pathogenic microorganism which comprises administering to fish having eel red disease, salmonoid furunculosis, bacterial gill-disease, or a disease caused by a microorganism of the genus Vibrio a compound having the formula

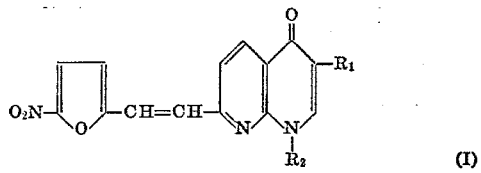
(I)

wherein $R_1$ is selected from the group consisting of hydrogen, carboxy, methoxycarbonyl and alkali metal oxycarbonyl, and $R_2$ is selected from the group consisting of hydrogen, methyl, allyl, 2-piperidinoethyl, the hydrochloric acid salt of 2-piperidinoethyl, 2-diethylaminoethyl, and the cyclohexyl sulfamic acid salt of 2-diethylaminoethyl in a dosage range of 2.5 to 10 mg. per kg. of body weight.

8. The method of claim 7 wherein the compound administered is potassium 1 - methyl - 1,4 - dihydro-7-[2 - (5 - nitro - 2 - furyl)vinyl] - 4 - oxo - 1,8 - naphthyridine-3-carboxylate.

9. The method of claim 7 wherein said compound is administered by immersing diseased fish in water containing said compound in a concentration of from 2 to 20 mcg per ml.

References Cited

FOREIGN PATENTS 270,627   5/1969   Austria.
1,152,788   5/1969   Great Britain.

OTHER REFERENCES

Snieszko: Antibiotics & Chemotherapy, vol. 9 (1959), p. 541.

SAM ROSEN, Primary Examiner

U.S. Cl. X.R.

260—240 A